United States Patent
Yamauchi et al.

(10) Patent No.: US 11,498,466 B2
(45) Date of Patent: Nov. 15, 2022

(54) JOINED BODY AND AUTOMOBILE SEAT FRAME

(71) Applicant: NHK Spring Co., Ltd., Yokohama (JP)

(72) Inventors: Yuichiro Yamauchi, Kanagawa (JP); Yu Yoda, Kanagawa (JP); Takuya Sato, Kanagawa (JP); Katsuji Goto, Kanagawa (JP); Masakazu Ando, Kanagawa (JP); Ayane Sato, Kanagawa (JP)

(73) Assignee: NHK Spring Co., Ltd., Yokohama (JP)

( * ) Notice: Subject to any disclaimer, the term of this patent is extended or adjusted under 35 U.S.C. 154(b) by 254 days.

(21) Appl. No.: 16/761,594

(22) PCT Filed: Nov. 15, 2018

(86) PCT No.: PCT/JP2018/042342
§ 371 (c)(1),
(2) Date: May 5, 2020

(87) PCT Pub. No.: WO2019/098292
PCT Pub. Date: May 23, 2019

(65) Prior Publication Data
US 2020/0317100 A1 Oct. 8, 2020

(30) Foreign Application Priority Data
Nov. 15, 2017 (JP) .............................. JP2017-220440

(51) Int. Cl.
*B60N 2/68* (2006.01)
*B23K 11/11* (2006.01)
(Continued)

(52) U.S. Cl.
CPC .............. *B60N 2/682* (2013.01); *B23K 11/11* (2013.01); *B23K 11/20* (2013.01); *F16B 5/0096* (2013.01);
(Continued)

(58) Field of Classification Search
None
See application file for complete search history.

(56) References Cited

U.S. PATENT DOCUMENTS 6,037,559 A * 3/2000 Okabe ................... B23K 11/115
219/91.23
7,588,837 B2  9/2009 Milam
(Continued)

FOREIGN PATENT DOCUMENTS

JP   H07-317844 A   12/1995
JP   H08-267254 A   10/1996
(Continued)

OTHER PUBLICATIONS

International Search Report dated Feb. 5, 2019, issued for PCT/JP2018/042342.

*Primary Examiner* — Daniel J. Schleis
(74) *Attorney, Agent, or Firm* — Locke Lord LLP (57) ABSTRACT

A joined body includes: a thin plate including through holes; first members each including: a base portion and a protruding portion inserted into one of the through holes; and a second member placed oppositely to the base portion via the thin plate and made of a material that is of a same kind as a material of the first members. The thin plate is made of a material having a specific gravity smaller than the materials of the first and the second members. The second member and an end portion of the protruding portion are connected together by melt-solidification. A post-joining hardness difference in a range of 30% along a direction orthogonal to a joint interface between the second member and the protruding portion, the range being centered on the joint interface, is equal to or less than 90% of a pre-joining hardness difference.

4 Claims, 7 Drawing Sheets

(51) Int. Cl.
*B23K 11/20* (2006.01)
*F16B 5/00* (2006.01)
*F16B 5/12* (2006.01)
*B23K 103/20* (2006.01)
*B23K 101/00* (2006.01)

(52) U.S. Cl.
CPC ........ *F16B 5/123* (2013.01); *B23K 2101/006* (2018.08); *B23K 2103/20* (2018.08)

(56) References Cited

U.S. PATENT DOCUMENTS

| | | |
|---|---|---|
| 8,028,889 B2 | 10/2011 | Milam |
| 2013/0309520 A1 | 11/2013 | Lang et al. |
| 2015/0217395 A1 | 8/2015 | Spinella et al. |
| 2018/0272411 A1 | 9/2018 | Katsuma et al. |
| 2018/0354231 A1* | 12/2018 | Iwase ........................ F16B 5/08 |

FOREIGN PATENT DOCUMENTS

| | | |
|---|---|---|
| JP | H09-85454 A | 3/1997 |
| JP | 2000-230537 A | 8/2000 |
| JP | 2008-539086 A | 11/2008 |
| JP | 2017-064726 A | 4/2017 |
| JP | 2017-510464 A | 4/2017 |
| JP | 2017-114055 A | 6/2017 |

* cited by examiner

JOINED BODY AND AUTOMOBILE SEAT FRAME

FIELD

The present invention relates to joined bodies and automobile seat frames.

BACKGROUND

For weight reduction of various parts used in automobiles, replacement of iron-based materials with aluminum-based materials has been investigated in recent years. While aluminum-based materials are suitable for the weight reduction, the replacement with aluminum-based materials makes those parts difficult to have sufficient product strength. Partial replacement of iron-based materials with aluminum-based materials has thus been investigated. When an iron-based material is replaced with an aluminum-based material, joining between the iron-based material and the aluminum-based material is needed.

Various techniques have been proposed for reduction of production of intermetallic compounds that cause reduction in joint strength in weld-joining between iron-based materials and aluminum-based materials (as described in, for example, Patent Literature 1 and Patent Literature 2). According to Patent Literature 1, after a part of a rivet is caused to penetrate an aluminum-based material by the rivet being pressed into the aluminum-based material, the rivet and an iron-based material are spot-welded together. According to Patent Literature 2, projections are formed by formation of plural dents in a long member (a fastener), the projections are inserted into holes formed in one of two members made of materials different from each other, and welding is performed in a state where the projections have been brought into contact with a base portion of the other member.

CITATION LIST

Patent Literature

Patent Literature 1: Japanese National Publication of International Patent Application No. 2017-510464
Patent Literature 2: Japanese Laid-open Patent Publication No. 2017-064726

SUMMARY

Technical Problem

For automobile seat frames, a technique has been adopted for ensuring strength of a seat frame by joining a pipe member made of an iron-based material to a plate-like panel made of an aluminum-based material. However, according to the joining technique disclosed in Patent Literature 1, when the rivet is caused to penetrate the aluminum-based material, diverted current is caused by conduction of electric current for welding through the aluminum-based material, and thus large electric current is needed for sufficient joint strength. Furthermore, if the aluminum-based material has an insulating coating or the like thereon, the insulating coating is peeled off when the rivet penetrates the aluminum-based material, electric corrosion is caused between the rivet and the aluminum-based material, and as a result, strength of the joint is reduced. Moreover, according to Patent Literature 1, there is a problem that the step for causing the rivet to penetrate the aluminum-based material is needed and the operation man-hour is thus increased. Therefore, the joining technique disclosed in Patent Literature 1 is not suitable for joining a plate-like member and a pipe-like member together.

Furthermore, according to Patent Literature 2, the projections need to be formed in the fastener correspondingly to the intervals between the holes formed in the one of the two members, and the formation of these projections demands high machining accuracy.

The present invention has been made in view of the above and has an object to provide a joined body and an automobile seat frame that enable easy and strong joining between a plate-like member and a pipe-like member and enable weight reduction.

Solution to Problem

To solve the above-described problem and achieve the object, a joined body according to the present invention includes: a thin plate including a plurality of through holes formed along an outer periphery of the thin plate; first members each including: a base portion, a part of which contacts the thin plate; and a protruding portion protruding from a surface of the base portion contacting the thin plate, the protruding portion being inserted into one of the through holes; and a second member placed oppositely to the base portion via the thin plate and made of a material that is of a same kind as a material of the first members, wherein the thin plate is made of a material having a specific gravity smaller than a specific gravity of the material of the first members and a specific gravity of the material of the second member, the second member and an end portion of the protruding portion are connected together by melt-solidification of a part of the second member and a part of the end portion, the end portion being at an end opposite to an end connected to the base portion, and a post-joining hardness difference that is a difference between a maximum value and a minimum value of hardness in a range of 30% along a direction orthogonal to a joint interface between the second member and the protruding portion, the range being centered on the joint interface, is equal to or less than 90% of a pre-joining hardness difference that is a difference between a hardness of the first members before the joining and a hardness of the second member before the joining.

Moreover, in the above-described joined body according to the present invention, the post-joining hardness difference is equal to or less than 80% of the pre-joining hardness difference.

Moreover, an automobile seat frame according to the present invention includes the above-described joined body according to the present invention.

Advantageous Effects of Invention

The present invention has an effect of enabling easy and strong joining between a plate-like member and a pipe-like member and enabling weight reduction.

DESCRIPTION OF EMBODIMENT

Hereinafter, a mode for implementation of the present invention will be described in detail, together with the drawings. The present invention is not limited by the following embodiment. Furthermore, the drawings referred to in the following description illustrate shapes, sizes, and positional relations merely schematically so as to enable subject matter of the present invention to be understood. That is, the present invention is not limited only to the shapes, sizes, and positional relations exemplified by the drawings.

EMBODIMENT

Figure 1:
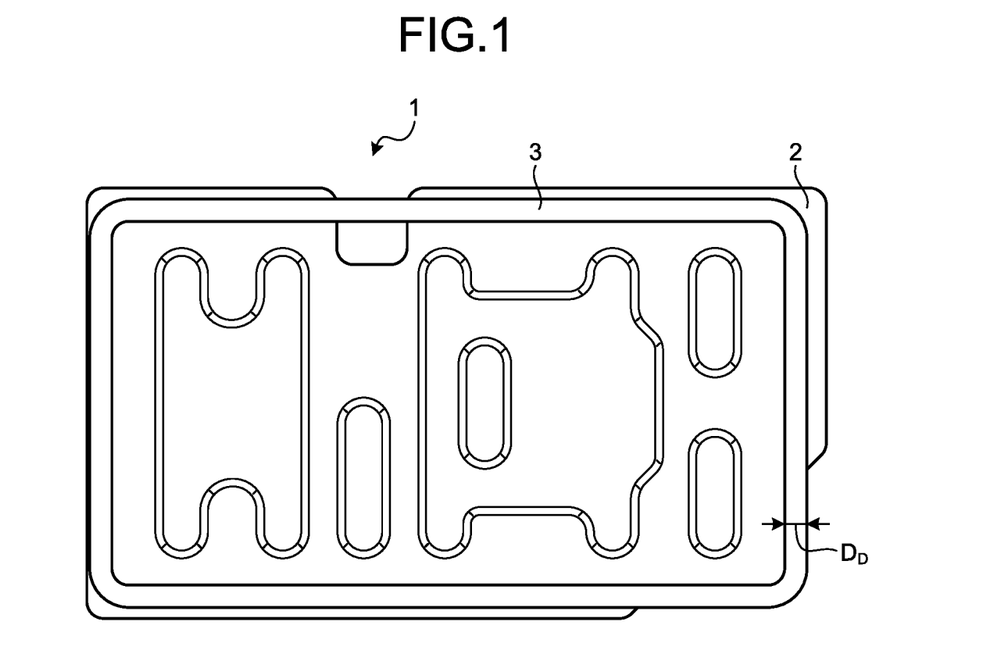
FIG. 1 is a front view of an automobile seat frame according to an embodiment of the present invention.
Figure 2:
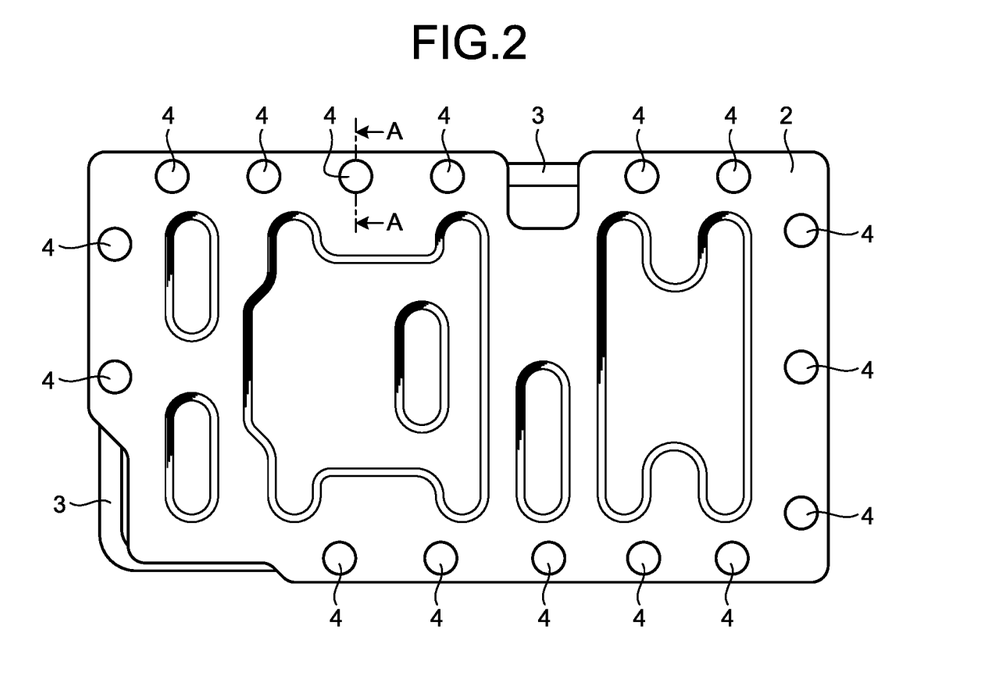
FIG. 2 is a rear view of the automobile seat frame in FIG. 1.
Figure 3:
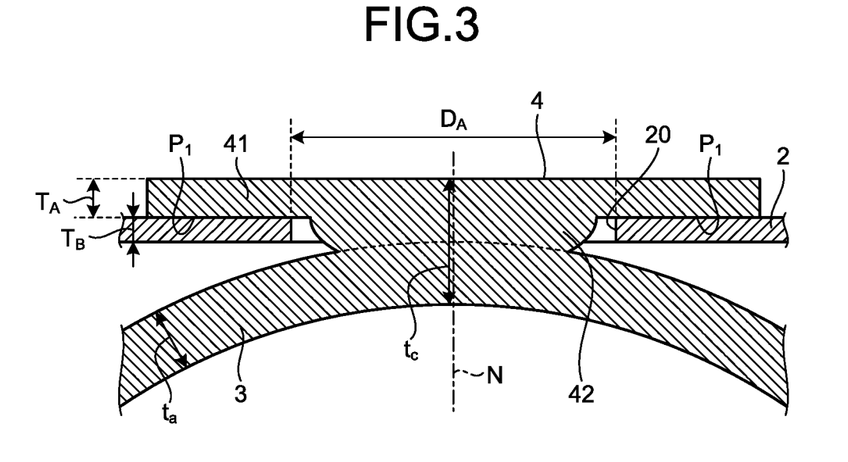
FIG. 3 is a partial enlarged sectional view taken on a line A-A in FIG. 2.

First of all, an automobile seat frame according to an embodiment of the present invention will be described in detail by reference to the drawings. FIG. 1 is a front view of the automobile seat frame according to the embodiment of the present invention. FIG. 2 is a rear view of the automobile seat frame in FIG. 1. FIG. 3 is a partial enlarged sectional view taken on a line A-A in FIG. 2.

An automobile seat frame 1 includes: a back panel 2 made of aluminum or aluminum alloy; a frame pipe 3 made of iron or iron-based alloy; and fastening pins 4 that fasten the back panel 2 and the frame pipe 3 together. In the automobile seat frame 1, the frame pipe 3 is fixed to the back panel 2, by the fastening pins 4 and the frame pipe 3 being joined together in a state where the fastening pins 4 have penetrated the back panel 2.

Figure 4:
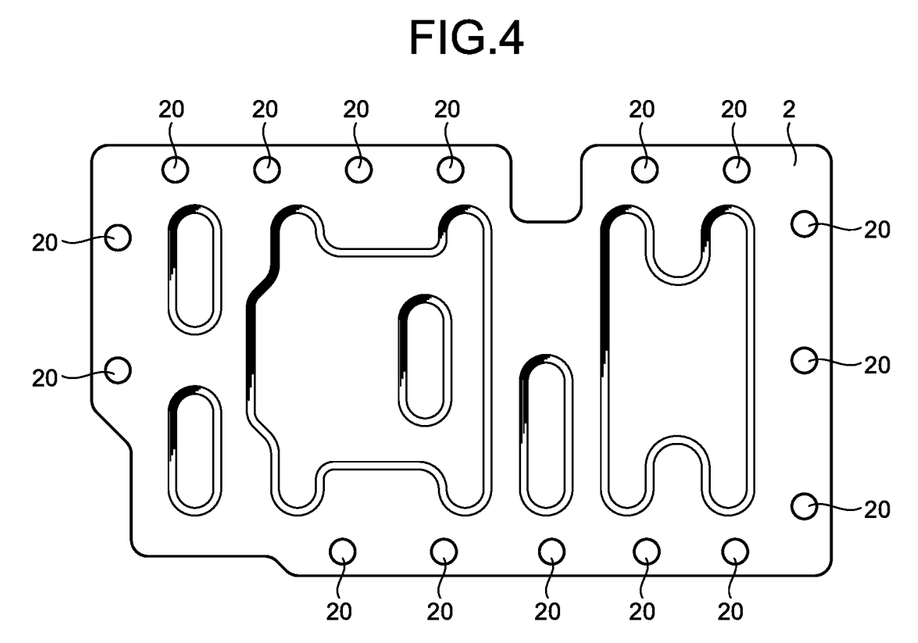
FIG. 4 is a rear view illustrating a configuration of a back panel of the automobile seat frame according to the embodiment of the present invention.

FIG. 4 is a rear view illustrating a configuration of a back panel of the automobile seat frame according to the embodiment of the present invention. The back panel 2 is a thin plate made of aluminum or aluminum alloy and is formed by press working or the like. The aluminum alloy is preferably high in strength, and for ease of press working, for example, a 5000 series (Al—Mg series) aluminum alloy, a 6000 series (Al—Mg—Si series) aluminum alloy, or a 7000 series (Al—Zn—Mg series) aluminum alloy is preferably used.

The back panel 2 has plural through holes 20 penetrating the back panel 2 along a plate thickness direction of the back panel 2 and formed along the outer periphery of the back panel 2. The through holes 20 are preferably formed simultaneously at the time of press working for formation of the external form of the back panel 2, for simplification of the manufacturing process.

The frame pipe 3 is a pipe having a circular cross-sectional shape and made of iron or iron-based alloy. A steel material having a tensile strength equal to or greater than 980 MPa and equal to or less than 1600 MPa may be used as the iron-based alloy, the steel material specifically being, for example, carbon steel, high tensile strength steel, ultra-high tensile strength steel, or stainless steel. For improvement of strength of the automobile seat frame 1, the frame pipe 3 is preferably formed of high tensile strength steel. The frame pipe 3 may have a cross-sectional shape that is oval, rectangular, or polygonal. The frame pipe 3 may be a solid frame or a plate-like frame.

Figure 5:
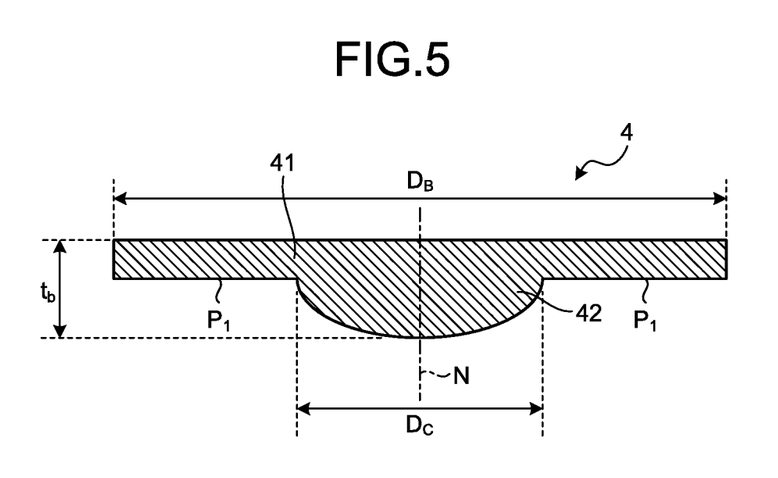
FIG. 5 is a sectional view illustrating a configuration of a fastening pin of the automobile seat frame according to the embodiment of the present invention.

FIG. 5 is a sectional view illustrating a configuration of a fastening pin of the automobile seat frame according to the embodiment of the present invention. FIG. 5 illustrates the fastening pin 4 before the fastening of the fastening pin 4 to the frame pipe 3. The fastening pin 4 has a base portion 41 that is discoidal, and a protruding portion 42 that is provided at the inner periphery of the base portion 41 and protrudes in one direction from the base portion 41. The protruding portion 42 is provided on a contact surface $P_1$ of the base portion 41, the contact surface $P_1$ coming into contact with the back panel 2, and has a shape hemispherically protruding from the contact surface $P_1$. The fastening pin 4 is formed of a material of the same kind as that of the frame pipe 3, for example, a member made of iron or iron-based alloy described above. For weldability and post-joining hardenability, the fastening pin 4 preferably contains carbon at a range of 0.1% to 0.5% inclusive.

A ratio of the maximum thickness $T_A$ of the base portion 41 of the fastening pin 4 to a thickness $T_B$ of the back panel 2 ($T_A/T_B$) preferably satisfies the relation, $1 \leq T_A/T_B \leq 1.50$ (as illustrated in FIG. 3).

According to this embodiment: where a diameter of the through hole 20 in the back panel 2 is $D_A$, a diameter of the base portion 41 of the fastening pin 4 is $D_B$, the diameter $D_B$ being along a direction perpendicular to a shaft N of the fastening pin 4, a diameter of the protruding portion 42 of the fastening pin 4 is $D_C$, the diameter $D_C$ being along the direction perpendicular to the shaft N, and a diameter of the frame pipe 3 is $D_D$; the diameters $D_A$ to $D_D$ have the relations, $D_C < D_A < D_B$ and $D_A < D_D$. For example, the diameter $D_A$ and the diameter $D_B$ have the relation, $1.5 \leq D_B/D_A \leq 2.5$. In a state where the frame pipe 3 and the fastening pin 4 have been joined together, the protruding portion 42 and an inner wall of the through hole 20 are separate from each other (as illustrated in FIG. 3). Furthermore, the back panel 2 and base portion 41 are in contact with each other. According to this embodiment, the diameter $D_D$ corresponds to a diameter formed by the outer circumference of the frame pipe 3.

At a joint between the frame pipe 3 and the fastening pin 4 (as illustrated in FIG. 3), a difference (a post-joining hardness difference) between the maximum value and minimum value of hardness in a range of 30% along a thickness direction (for example, a shaft N direction), the range being centered on a joint interface, is equal to or less than 90%, and preferably equal to or less than 80%, of a difference (a pre-joining hardness difference) between a hardness of the frame pipe 3 before the joining and a hardness of the fastening pin 4 before the joining. This range of 30% along the thickness direction, the range being centered on the joint interface, is a range having end points each positioned at 15% of the entire thickness from the joint interface. Furthermore, the joint interface is a virtual plane assumed to have been a boundary between the frame pipe 3 and fastening pin 4 before the joining, and is assumed to be a position defined by the expression, $t_c \times t_b/(t_a+t_b)$, the position being a position from a surface of the fastening pin 4 (the protruding portion 42), the surface being on a side not joined to the frame pipe 3, where a thickness of the frame pipe 3 before the joining is $t_a$, a height of the fastening pin 4 before the joining is $t_b$, and a thickness after the joining is $t_c$. The above described thickness $t_a$, height $t_b$, and thickness $t_c$ are on the same axis passing through corresponding positions before the joining and after the joining. In FIG. 3, a broken line illustrated at the joint between the frame pipe 3 and fastening pin 4 represents an outer rim of the frame pipe 3 before the joining and is different from the joint interface.

Figure 6A:
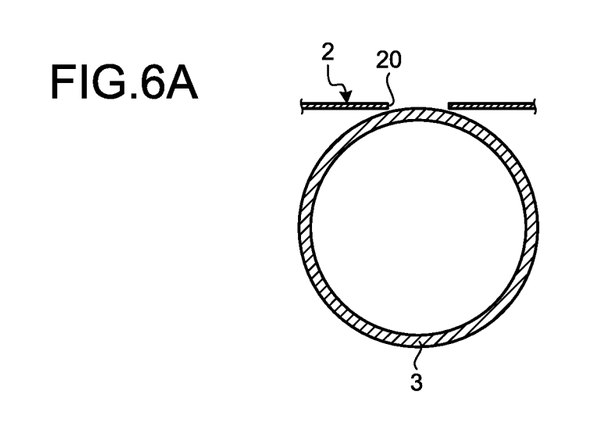
FIG. 6A is diagram illustrating (a first part of) a joining method for the automobile seat frame according to the embodiment of the present invention.
Figure 6B:
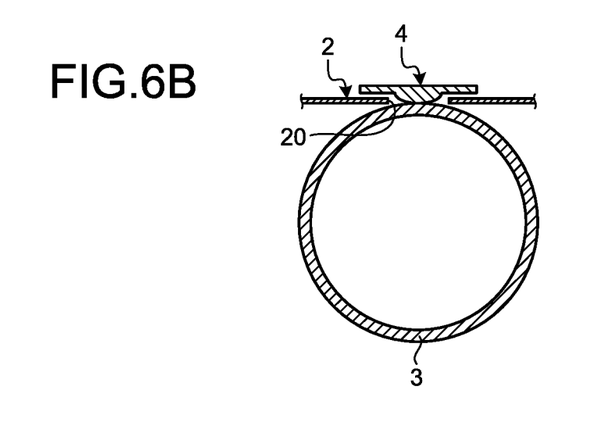
FIG. 6B is diagram illustrating (a second part of) the joining method for the automobile seat frame according to the embodiment of the present invention.
Figure 6C:
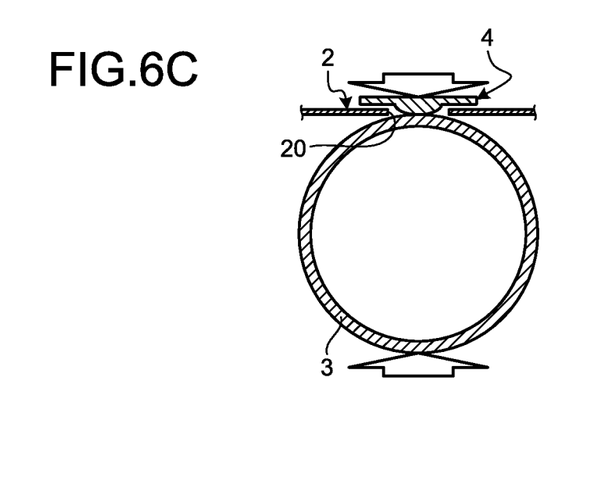
FIG. 6C is diagram illustrating (a third part of) the joining method for the automobile seat frame according to the embodiment of the present invention.

Next, a method of joining the fastening pin 4 and the frame pipe 3 together will be described by reference to FIG. 6A to FIG. 6C. FIG. 6A to FIG. 6C are diagrams illustrating a joining method for the automobile seat frame according to the embodiment of the present invention. Firstly, as illustrated in FIG. 6A, the frame pipe 3 is placed on the back panel 2 having the through holes 20 formed therein beforehand, along the through holes 20.

After the frame pipe 3 has been placed on the back panel 2, as illustrated in FIG. 6B, the protruding portion 42 of the fastening pin 4 is inserted into the through hole 20 and abutted against the frame pipe 3 (abutting step). In states of FIG. 6A and FIG. 6B, positions of the frame pipe 3 and fastening pin 4 have been fixed by use of a jig not illustrated in the drawings, the positions being relative to the back panel 2. The fastening pin 4 may be inserted into the through hole 20 before the placement of the frame pipe 3.

Thereafter, the frame pipe 3 and the fastening pin 4 are sandwiched between two electrodes, along a radial direction of the frame pipe 3, electricity is conducted therebetween, resistance spot welding is thereby carried out (as illustrated in FIG. 6C: joining step), and a boundary portion where the frame pipe 3 and the fastening pin 4 abut onto each other is melt-solidified. A joined body as illustrated in FIG. 3 is thereby able to be obtained. Furthermore, by resistance spot welding between the frame pipe 3 and fastening pin 4 that are made of the same material, joining with reduced production of intermetallic compounds is enabled.

By use of the fastening pin 4 having a planar upper surface according to the embodiment, an electrode having a larger diameter than that for a fastening pin having a curved upper surface is able to be used. Resistance of the electrode to continuous use thereof is thereby able to be improved.

Figure 7:
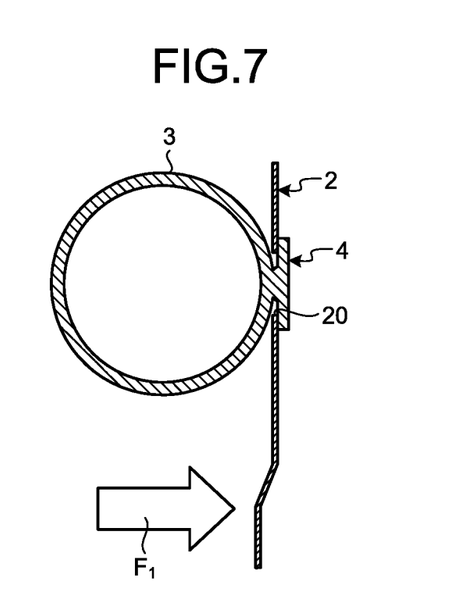
FIG. 7 is a diagram illustrating a load applied to the automobile seat frame according to the embodiment of the present invention.
Figure 8:
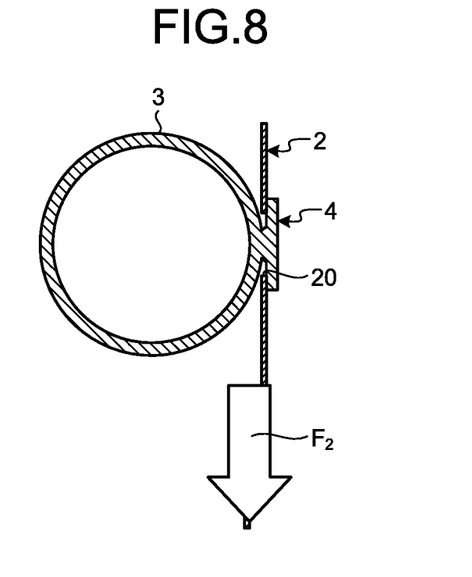
FIG. 8 is a diagram illustrating a load applied to the automobile seat frame according to the embodiment of the present invention.

FIG. 7 and FIG. 8 are diagrams illustrating loads applied to the automobile seat frame according to the embodiment of the present invention. The automobile seat frame 1 made by joining as described above has both endurance strength against a load along the plate thickness direction of the back panel 2 (a load $F_1$ in a peeling direction as illustrated in FIG. 7) and endurance strength against a load along a direction parallel to a plane of the back panel 2 (a load $F_2$ in a shearing direction as illustrated in FIG. 8).

According to the above described embodiment, the automobile seat frame 1 is manufactured, the automobile seat frame 1 having the back panel 2 sandwiched and mechanically fastened between the frame pipe 3 and the base portions 41, by: insertion of the protruding portions 42 of the fastening pins 4 into the through holes 20 of the back panel 2; and resistance spot welding in a state where the protruding portions 42 have abutted against the frame pipe 3. In this manufacture, at a joint between the frame pipe 3 and the fastening pin 4, a hardness difference in a range of 30% along a thickness direction, the range being centered on a joint interface therebetween, is equal to or less than 90% of a difference between the hardness of the frame pipe 3 before the joining and the hardness of the fastening pin 4 before the joining. According to the embodiment, by obtainment of bonding strength with reduced production of intermetallic compounds through resistance spot welding; a plate-like member and a pipe-like member are able to be joined together easily and strongly, and weight reduction is enabled.

In addition to welding, metal inert gas (MIG) brazing, and laser brazing; fixing by use of rivets has been known conventionally. For example, in a case where the back panel 2 and the frame pipe 3 according to this embodiment are attempted to be fixed by use of rivets, after through holes are formed by the rivets in a back panel not having the through holes 20 formed therein, joining is performed by resistance spot welding or the like. In this case, by boring with the rivets, shaft portions of the rivets meet the back panel so as to be in close contact with the back panel, and thus electric current is diverted at the time of resistance spot welding and proper joining may not be achieved.

According to the above description of the embodiment, the protruding portion 42 and the inner wall of the through hole 20 are separate from each other, but a part of the protruding portion 42 and a part of the inner wall of the through hole 20 may be in contact with each other.

Furthermore, according to the above described embodiment, an insulating coating may be formed on a surface of the back panel 2 or an insulating coating may be formed on an outer surface of the automobile seat frame 1.

Modification of Embodiment

Figure 9:
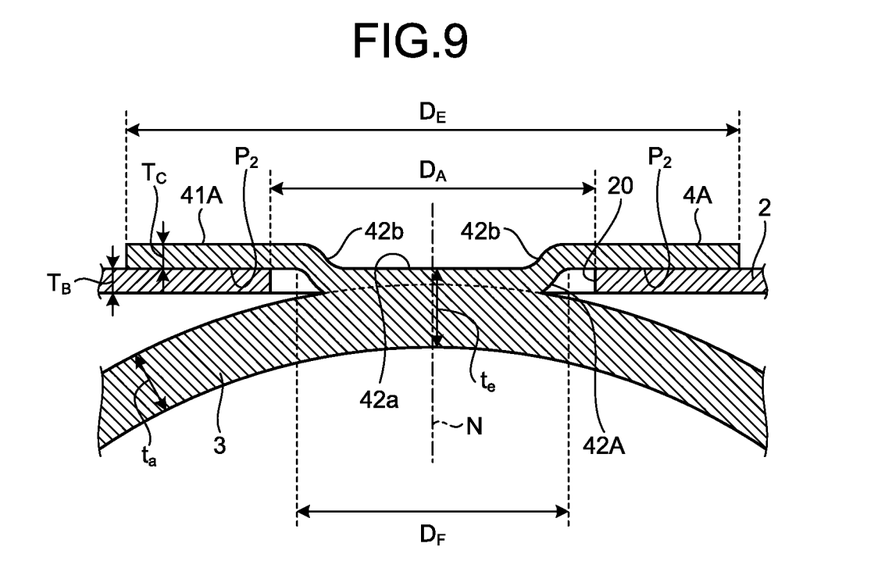
FIG. 9 is a partial enlarged sectional view of an automobile seat frame according to a modification of the embodiment of the present invention.

FIG. 9 is a partial enlarged sectional view of an automobile seat frame according to a modification of the embodiment of the present invention. The automobile seat frame according to the modification of the embodiment includes the above described back panel 2 and frame pipe 3, and fastening pins 4A that fasten the back panel 2 and frame pipe 3 together. Hereinafter, description of components that are the same as those of the above described embodiment (the back panel 2 and frame pipe 3) will be omitted.

The fastening pins 4A are formed by press working through use of a material that is of the same kind as that of the frame pipe 3, for example, iron or iron-based alloy described above. The fastening pins 4A each have a base portion 41A that comes into contact with the back panel 2, and a protruding portion 42A that protrudes in one direction from the base portion 41A. The base portion 41A has an annular shape extending radially from the outer circumference of the protruding portion 42A. The protruding portion 42A is connected to the inner periphery of the base portion 41A, is provided on a contact surface $P_2$ of the base portion 41A, the contact surface $P_2$ coming into contact with the back panel 2, and has a shape protruding from the contact surface P$_2$. The protruding portion 42A has: a plate portion 42a that is provided at a position offset from the base portion 41A and is plate-like; and a conical portion 42b connected to the base portion 41A and the plate portion 42a.

Figure 10:
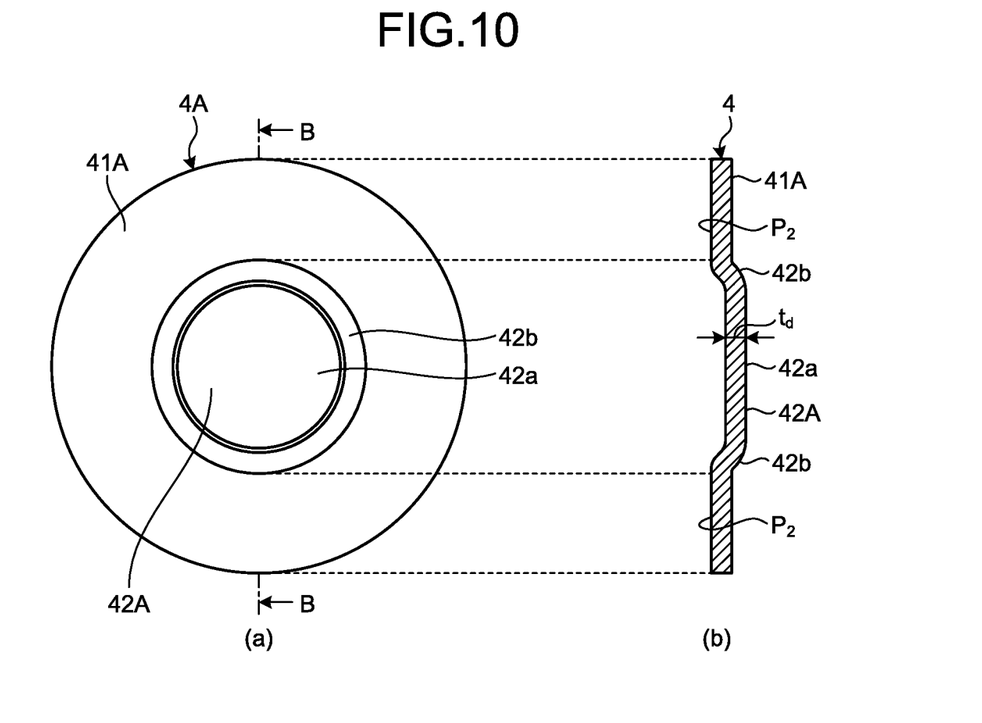
FIG. 10 is a diagram illustrating a configuration of a fastening pin of the automobile seat frame according to the modification of the embodiment of the present invention.

FIG. 10 is a diagram illustrating a configuration of a fastening pin of the automobile seat frame according to the modification of the embodiment of the present invention. In FIG. 10, (a) is a plan view of the fastening pin 4A as viewed along a shaft N direction from the protruding portion 42A. In FIG. 10, (b) is a sectional view taken on a line B-B illustrated at (a) in FIG. 10. The fastening pin 4A has a uniform thickness. A ratio of a thickness T$_C$ of the fastening pin 4A to a thickness T$_B$ of the back panel 2 (T$_C$/T$_B$) preferably has the relation, $1 \leq T_C/T_B \leq 1.50$.

The protruding portion 42A of the fastening pin 4A is joined to the frame pipe 3 by welding. This welding is resistance spot welding described above.

Where the diameter of the through holes 20 of the back panel 2 is D$_A$, a diameter of the base portion 41A of the fastening pin 4A is D$_E$, the diameter D$_E$ being along a direction perpendicular to a shaft N of the fastening pin 4A, a diameter of the protruding portion 42A of the fastening pin 4A is D$_F$, the diameter D$_F$ being along the direction perpendicular to the shaft N, and the diameter of the frame pipe 3 is D$_D$; the diameters D$_A$ and D$_D$ to D$_F$ have the relations D$_F$<D$_A$<D$_E$ and D$_A$<D$_D$. In a state where the frame pipe 3 and the fastening pin 4A have been joined together, the protruding portion 42A and the inner wall of the through hole 20 are separate from each other (as illustrated in FIG. 9). Furthermore, the back panel 2 and base portion 41A are in contact with each other.

Figure 11:
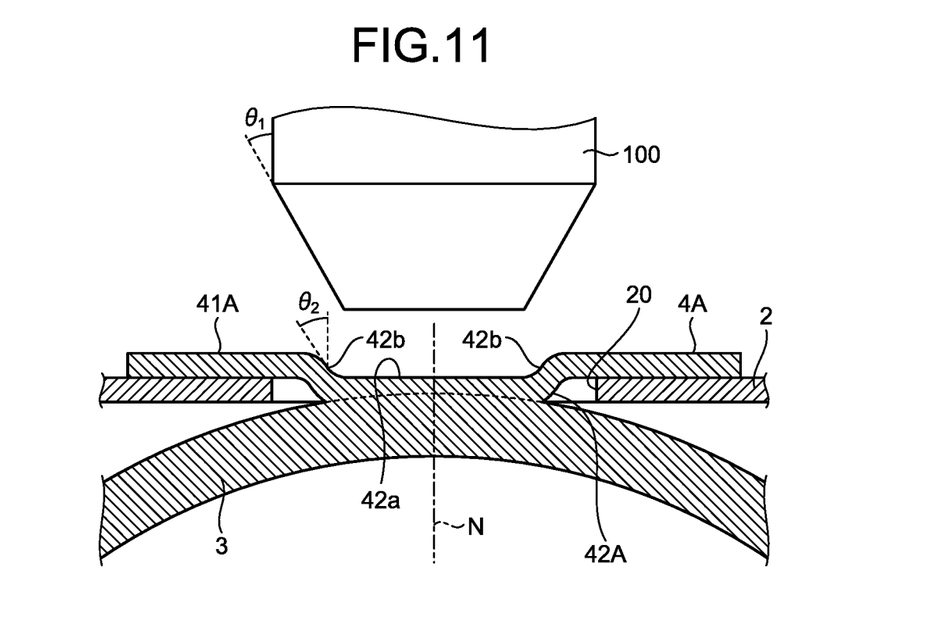
FIG. 11 is a diagram illustrating a joining method for the automobile seat frame according to the modification of the embodiment of the present invention.

Next, a method of joining the fastening pin 4A and the frame pipe 3 together will be described by reference to FIG. 6A and FIG. 11. FIG. 11 is a diagram illustrating a joining method for the automobile seat frame according to the modification of the embodiment of the present invention.

Firstly, the frame pipe 3 is placed on the back panel 2 having the through holes 20 formed therein beforehand, along these through holes 20 (as illustrated in FIG. 6A). After the frame pipe 3 has been placed on the back panel 2, the protruding portion 42A of the fastening pin 4A is inserted into the through hole 20, and abutted against the frame pipe 3 (abutting step). In this state, positions of the frame pipe 3 and fastening pin 4A have been fixed by use of a jig not illustrated in the drawings, the positions being relative to the back panel 2. The fastening pin 4A may be inserted into the through hole 20 before the placement of the frame pipe 3.

Thereafter, as illustrated in FIG. 11, the frame pipe 3 and the fastening pin 4A are sandwiched between two electrodes (although only one of the electrodes, an electrode 100, is illustrated in FIG. 11) along the radial direction of the frame pipe 3, electricity is conducted therebetween, resistance spot welding is thereby carried out (joining step), and a boundary portion where the frame pipe 3 and the fastening pin 4A abut onto each other is melt-solidified. A joined body as illustrated in FIG. 9 is thereby able to be obtained. Furthermore, by resistance spot welding between the frame pipe 3 and fastening pin 4A that are made of the same material, joining with reduced production of intermetallic compounds is enabled.

According to this modification also, at a joint between the frame pipe 3 and the fastening pin 4A (as illustrated in FIG. 9), a difference (a post-joining hardness difference) between the maximum value and minimum value of hardness in a range of 30% along a thickness direction (for example, the shaft N direction), the range being centered on a joint interface, is equal to or less than 90%, and preferably equal to or less than 80%, of a difference (a pre-joining hardness difference) between the hardness of the frame pipe 3 before the joining and a hardness of the fastening pin 4A before the joining. The joint interface according to this modification is at a position defined by the expression, $t_e \times t_d/(t_a+t_d)$, the position being a position from a surface of the fastening pin 4A (plate portion 42a), the surface being on a side not joined to the frame pipe 3, where the thickness of the frame pipe 3 before the joining is $t_a$, a plate thickness of the plate portion 42a of the fastening pin 4A before the joining is $t_d$, and a thickness after the joining is $t_e$.

The electrode 100 used in the resistance spot welding for welding between the frame pipe 3 and fastening pin 4A has a distal end with a planar surface and a side surface that is conical, and an inclination angle $\theta_1$ of this conical side surface with respect to a central axis thereof along a longitudinal direction thereof is equal to or less than an inclination angle $\theta_2$ of the conical portion 42b with respect to the shaft N of the fastening pin 4A. The distal end planar surface of the electrode 100 and the plate portion 42a thereby face each other, and electric current is able to be caused to flow efficiently between the frame pipe 3 and the plate portion 42a.

According to the above described modification, by insertion of the protruding portion 42A of the fastening pin 4A into the through hole 20 of the back panel 2 and resistance spot welding in a state where an end portion of the protruding portion 42A has abutted onto the frame pipe 3, the end portion being at an end opposite to an end closer to the base portion 41A; an automobile seat frame is able to be manufactured, the automobile seat frame having the back panel 2 sandwiched and mechanically fastened between the frame pipe 3 and the base portion 41A. According to the modification, joining strength is obtained by reduction of intermetallic compounds through resistance spot welding; and a plate-like member and a pipe-like member are thereby able to be joined together strongly, and weight reduction is thereby enabled.

Furthermore, weight reduction is enabled according to the above described modification, as compared to the fastening pin 4 according to the above described embodiment, and the fastening pin 4A is able to be manufactured inexpensively because the fastening pin 4A has a shape that is able to be readily formed by pressing.

The fastening pin 4 according to the above described embodiment, on the other hand, does not require high positioning accuracy because a distal end surface of an electrode does not need to aim a portion (the protruding portion 42A) of the fastening pin 4A. Therefore, the fastening pin 4 can be said to be higher in productivity than the fastening pin 4A.

The present invention may thus include various embodiments not described herein, and various design changes and the like may be made without departing from the technical ideas determined by the claims. In this specification, description has been made by use of examples of automobile seat frames, but for example, a joined body manufactured by resistance spot welding between a hollow pipe and a fastening pin through use of a thin plate, the hollow pipe, and the fastening pin may be applied to a product that is not an automobile seat frame, the thin plate being made of aluminum or aluminum alloy, the hollow pipe being made of iron or iron alloy, the fastening pin having a base portion and a protruding portion.

Furthermore, the thin plate, and the hollow pipe and fastening pin are not limited to the combination of aluminum and iron, and any material having a specific gravity smaller than that of the material forming the hollow pipe and fastening pin may be used for the thin plate. For example, if the material forming the hollow pipe and fastening pin is iron: resin, such as polypropylene, carbon fiber reinforced plastic (CFRP), or glass fiber reinforced plastic (GFRP); alloy having titanium as a main component; alloy having magnesium as a main component; or the like may be used for the thin plate.

EXAMPLES

Described hereinafter are examples of an automobile seat frame according to the present invention. The present invention is not limited to these examples.

First Example

A joined body as illustrated in FIG. 9 was made as a test piece by resistance spot welding where the electric current value was 5.0 kA, the time period of electric conduction was 100 milliseconds, and the welding force of a fastening pin on a frame pipe was 0.5 kN, by use of: an aluminum panel (corresponding to the back panel 2) made of an aluminum alloy (A5182), having a through hole (corresponding to the through hole 20) formed therein, and having a cation-coated surface; a frame pipe (an electric resistance welded carbon steel tube for an automobile structure (SIAM): corresponding to the frame pipe 3) having a thickness of 1.6 mm, a tensile strength of about 1470 MPa, and a Vickers hardness of HV478; and a fastening pin (corresponding to the fastening pin 4A) formed by use of a plate material with a plate thickness of 0.8 mm and having a Vickers hardness of HV92. A diameter of a protruding portion of the fastening pin was smaller than a diameter of the through hole of the aluminum panel. In First Example, a hardness difference before the joining was 386.

Second Example

A test piece in Second Example was the same as that in First Example except that a frame pipe had a thickness of 1.0 mm, a tensile strength of about 980 MPa, and a Vickers hardness of HV352, and the electric current value for joining was 4.0 kA, in Second Example. In Second Example, a hardness difference before the joining was 260.

Third Example

A test piece in Third Example was the same as that in First Example except that a frame pipe had a thickness of 1.0 mm, a tensile strength of about 980 MPa, and a Vickers hardness of HV352, the electric current value for joining was 4.0 kA, and the time period of electric conduction was 140 milliseconds, in Third Example. In Third Example, a hardness difference before the joining was 260.

Fourth Example

A test piece in Fourth Example was the same as that in First Example except that in Fourth Example, an aluminum panel that had not been cation-coated was used. In Fourth Example, a hardness difference before the joining was 386.

Fifth Example

A test piece in Fifth Example was the same as that in First Example except that a frame pipe had a thickness of 1.0 mm, a tensile strength of about 980 MPa, and a Vickers hardness of HV352, and the electric current value for joining was 4.5 kA, in Fifth Example. In Fifth Example, a hardness difference before joining was 260.

First Comparative Example

A test piece in First Comparative Example was the same as that in First Example except that a fastening pin had a plate thickness of 0.4 mm, the electric current value for joining was 7.0 kA, and the welding force was 2.5 kN, in First Comparative Example. In First Comparative Example, a hardness difference before the joining was 386.

Second Comparative Example

A test piece in Second Comparative Example was the same as that in First Example except that a frame pipe had a thickness of 1.0 mm, a tensile strength of about 980 MPa, and a Vickers hardness of HV352, the electric current value for joining was 7.0 kA, and the welding force was 1.0 kN, in Second Comparative Example. In Second Comparative Example, a hardness difference before the joining was 260.

Peeling tests were conducted for joined bodies according to First to Fifth Examples and First and Second Comparative Examples. In the peeling tests, the peeling load Fl illustrated in FIG. 7 was gradually increased, peeling withstanding loads at the time of breakage were measured, and whether or not a predetermined peeling withstanding load had been satisfied was evaluated. In the peeling tests, "OK" meant that the predetermined peeling withstanding load was satisfied, and "NG" meant that the predetermined peeling withstanding load was not satisfied. Results of the peeling tests are listed in Table 1, together with the thicknesses $t_a$ of the frame pipes 3 before the joining, the plate thicknesses $t_d$ of the plate portions of the fastening pins before the joining (corresponding to the plate portions 42a of the fastening pins 4A), and the thicknesses $t_e$ after the joining (as illustrated in FIG. 9 and FIG. 10). As listed in Table 1, satisfactory results were obtained for the joined bodies according to First to Fifth Examples, but satisfactory results were not obtained for the joined bodies according to First and Second Comparative Examples.

TABLE 1

|  | First Example | Second Example | Third Example | Fourth Example | Fifth Example | First Comparative Example | Second Comparative Example |
|---|---|---|---|---|---|---|---|
| $t_a$ [mm] | 1.6 | 1.0 | 1.0 | 1.6 | 1.0 | 1.6 | 1.0 |
| $t_d$ [mm] | 0.8 | 0.8 | 0.8 | 0.8 | 0.8 | 0.4 | 0.8 |
| $t_e$ [mm] | 2.1 | 1.7 | 1.8 | 2.0 | 1.8 | 1.9 | 1.6 |
| Peeling Test Results | OK | OK | OK | OK | OK | NG | NG |

Furthermore, Vickers hardnesses after the joining were measured for the joined bodies according to First to Fifth Examples and First and Second Comparative Examples. Specifically, for each of the joined bodies, a Vickers hardness was measured at 0.1-mm intervals from a surface of the fastening pin along an axis passing the center of the fastening pin and extending in the thickness direction. Results of this measurement are listed in Table 2.

TABLE 2

| Distance [mm] | First Example | Second Example | Third Example | Fourth Example | Fifth Example | First Comparative Example | Second Comparative Example |
|---|---|---|---|---|---|---|---|
| 0.1 | 190.9 | 194.5 | 198.1 | 336.7 | 180.9 | 102.4 | 178.8 |
| 0.2 | 252.9 | 186.4 | 182.0 | 372.0 | 201.9 | 148.4 | 204.4 |
| 0.3 | 267.7 | 205.7 | 183.0 | 372.0 | 236.1 | 127.8 | 236.0 |
| 0.4 | 368.8 | 194.5 | 187.5 | 381.7 | 246.0 | 457.1 | 198.1 |
| 0.5 | 372.0 | 219.4 | 189.8 | 378.4 | 288.1 | 470.3 | 186.4 |
| 0.6 | 375.2 | 219.4 | 194.5 | 303.9 | 320.9 | 465.8 | 428.3 |
| 0.7 | 347.9 | 239.3 | 231.3 | 381.7 | 267.7 | 470.3 | 409.4 |
| 0.8 | 479.4 | 368.8 | 385.0 | 432.2 | 413.1 | 465.8 | 416.8 |
| 0.9 | 440.3 | 398.6 | 375.2 | 461.4 | 424.4 | 452.8 | 413.1 |
| 1.0 | 452.8 | 409.4 | 391.7 | 484.1 | 405.8 | 470.3 | 436.2 |
| 1.1 | 461.4 | 440.3 | 405.8 | 493.6 | 428.3 | 448.6 | 436.2 |
| 1.2 | 452.8 | 424.4 | 440.3 | 524.0 | 436.2 | 474.8 | 413.1 |
| 1.3 | 448.6 | 432.2 | 432.2 | 524.0 | 424.4 | 493.6 | 416.8 |
| 1.4 | 457.1 | 432.2 | 424.4 | 452.8 | 436.2 | 474.8 | 395.2 |
| 1.5 | 488.8 | 391.7 | 416.8 | 440.3 | 420.6 | 479.4 | 413.1 |
| 1.6 | 508.5 | 405.8 | 416.8 | 470.3 | 398.7 | 518.7 | 424.4 |
| 1.7 | 524.0 | 409.4 | 428.3 | 436.2 | 444.4 | 518.7 | — |
| 1.8 | 457.1 | — | 416.8 | 402.2 | 409.4 | 479.4 | — |
| 1.9 | 432.2 | — | — | 381.7 | — | 503.4 | — |
| 2.0 | 465.8 | — | — | 436.2 | — | — | — |
| 2.1 | 484.1 | — | — | — | — | — | — |

Ratios of Vickers hardness differences (differences between the maximum values and the minimum values: post-joining hardness differences) to the differences between the hardnesses of the frame pipes before the joining and the hardnesses of the fastening pins before the joining (the pre-joining hardness differences) were as follows, the Vickers hardness differences each being in a range of 30% around the joint interface (a range indicated by hatching in Table 1).

First Example: (479.4−347.9)/386≈0.341
Second Example: (409.4−219.4)/260≈0.731
Third Example: (391.7−194.5)/260≈0.758
Fourth Example: (461.4−303.9)/386≈0.408
Fifth Example: (424.4−267.7)/260≈0.603
First Comparative Example: (470.3−102.4)/386≈0.953
Second Comparative Example: (428.3−186.4)/260≈0.930

For each of the joined bodies according to First to Fifth Examples, the ratio of the post-joining hardness difference to the pre-joining hardness difference was equal to or less than 90% (0.900). In contrast, for each of the joined bodies according to First and Second Comparative Examples, the ratio of the post-joining hardness difference to the pre-joining hardness difference was greater than 90% (0.900).

Joined bodies as illustrated in FIG. 9 have been described for the examples above, but the joined body illustrated in FIG. 3 is considered to have a similar hardness difference also.

As described above, a joined body and an automobile seat frame according to the present invention are suitable for easy and strong joining between a plate-like member and a pipe-like member and for weight reduction.

INDUSTRIAL APPLICABILITY

As described above, a joined body and an automobile seat frame according to the present invention are suitable for easy and strong joining between a plate-like member and a pipe-like member and for weight reduction.

REFERENCE SIGNS LIST

1 AUTOMOBILE SEAT FRAME
2 BACK PANEL
3 FRAME PIPE
4 FASTENING PIN
20 THROUGH HOLE
41, 41A BASE PORTION
42, 42A PROTRUDING PORTION
42a PLATE PORTION
42b CONICAL PORTION

The invention claimed is:
1. A joined body comprising:
a thin plate including a plurality of through holes formed along an outer periphery of the thin plate;

first members each including:
- a base portion, a part of which contacts the thin plate; and
- a protruding portion protruding from a surface of the base portion contacting the thin plate, the protruding portion being inserted into one of the through holes; and a second member placed oppositely to the base portion via the thin plate and made of a material that is of a same kind as a material of the first members, wherein the thin plate is made of a material having a specific gravity smaller than a specific gravity of the material of the first members and a specific gravity of the material of the second member, the second member and an end portion of the protruding portion are connected together by melt-solidification of a part of the second member and a part of the end portion, the end portion being at an end opposite to an end connected to the base portion, and a post-joining hardness difference that is a difference between a maximum value and a minimum value of a Vickers hardness in a range of 30% along a direction orthogonal to a joint interface between the second member and the protruding portion, the range being centered on the joint interface, is equal to or less than 90% of a pre-joining hardness difference that is a difference between a Vickers hardness of the first members before the joining and a Vickers hardness of the second member before the joining.

2. The joined body according to claim 1, wherein the post-joining hardness difference is equal to or less than 80% of the pre-joining hardness difference.

3. An automobile seat frame comprising:
a joined body including:
- a thin plate including a plurality of through holes formed along an outer periphery of the thin plate;
- first members each including:
  - a base portion, a part of which contacts the thin plate; and
  - a protruding portion protruding from a surface of the base portion contacting the thin plate, the protruding portion being inserted into one of the through holes; and
- a second member placed oppositely to the base portion via the thin plate and made of a material that is of a same kind as a material of the first members, wherein the thin plate is made of a material having a specific gravity smaller than a specific gravity of the material of the first members and a specific gravity of the material of the second member, the second member and an end portion of the protruding portion are connected together by melt-solidification of a part of the second member and a part of the end portion, the end portion being at an end opposite to an end connected to the base portion, and a post-joining hardness difference that is a difference between a maximum value and a minimum value of a Vickers hardness in a range of 30% along a direction orthogonal to a joint interface between the second member and the protruding portion, the range being centered on the joint interface, is equal to or less than 90% of a pre-joining hardness difference that is a difference between a Vickers hardness of the first members before the joining and a Vickers hardness of the second member before the joining.

4. The automobile seat frame according to claim 3, wherein the post-joining hardness difference is equal to or less than 80% of the pre-joining hardness difference.

* * * * *